(12) United States Patent
Kovach et al.

(10) Patent No.: US 9,452,942 B2
(45) Date of Patent: Sep. 27, 2016

(54) WATER TREATMENT SYSTEM (75) Inventors: Jerome P. Kovach, Chagrin Falls, OH (US); Stuart L. Park, Chardon, OH (US); Francis A. Red, Parma, OH (US); Keith E. Brown, Solon, OH (US); James W. Kewley, Colorado Springs, CO (US); George R. Jordan, Jr., Chardon, OH (US); Jimmie L. Hunt, Jr., Girard, OH (US); Dale J. Spangenberg, Jr., Chardon, OH (US)

(73) Assignee: Kinetico Incorporated, Newbury, OH (US)

( * ) Notice: Subject to any disclaimer, the term of this patent is extended or adjusted under 35 U.S.C. 154(b) by 228 days.

(21) Appl. No.: 14/241,283

(22) PCT Filed: Aug. 29, 2012

(86) PCT No.: PCT/US2012/052851
§ 371 (c)(1),
(2), (4) Date: Feb. 26, 2014

(87) PCT Pub. No.: WO2013/033204
PCT Pub. Date: Mar. 7, 2013

(65) Prior Publication Data
US 2014/0299550 A1 Oct. 9, 2014

Related U.S. Application Data (60) Provisional application No. 61/528,367, filed on Aug. 29, 2011.

(51) Int. Cl.
*C02F 1/42* (2006.01)
*B01J 49/00* (2006.01)

(52) U.S. Cl.
CPC .............. *C02F 1/42* (2013.01); *B01J 49/0086* (2013.01); *B01J 49/0095* (2013.01);
(Continued)

(58) Field of Classification Search
CPC ................ C02F 1/42; C02F 2001/425; C02F 2201/005; C02F 2209/00; C02F 2209/445; C02F 2301/043; C02F 2303/16; B01J 49/0008; B01J 49/0086; B01J 49/0091; B01J 49/0095
See application file for complete search history.

(56) References Cited

U.S. PATENT DOCUMENTS 2,935,196 A    5/1960  Miller
3,509,998 A *  5/1970  Pellett ................. B01J 49/0091
                                                137/446

(Continued)

OTHER PUBLICATIONS

PCT/US12/52851 International Search Report & Written Opinion Completed Dec. 8, 2012.

*Primary Examiner* — Matthew O Savage
(74) *Attorney, Agent, or Firm* — Tarolli, Sundheim, Covell & Tummino LLP (57) ABSTRACT

A method and apparatus for treating water including a tank having an inlet and outlet and a water treatment material or resin within the tank. A control valve assembly having multiple, separable levels houses a water usage metering mechanism and a regeneration control mechanism, each having associated turbines. An inlet/bypass valve communicates source water with the tank inlet or directly to a system outlet. When the treatment material is exhausted, it is regenerated by actuating the bypass valve to communicate the source water with the system outlet. The turbine driven regeneration control then sequences the steps of regeneration, including opening a control valve to communicate inlet water to a venturi in order to aspirate brine solution and deliver to the tank outlet. The brine solution passes through the treatment material and is discharged through the tank inlet which is communicated to a system drain. At the conclusion of this step, brine solution is blocked from the venturi and the tank is slow rinsed. Subsequently, the communication of the venturi with the tank inlet is blocked, but water is allowed to flow through the venturi and refill the brine reservoir. Water at the outlet is then communicated to the tank outlet to perform a fast rinse. At the conclusion of this step, the source water is communicated to the tank inlet and the bypass step is terminated.

12 Claims, 8 Drawing Sheets

(52) U.S. Cl.
CPC ..... *B01J 49/0008* (2013.01); *C02F 2001/425* (2013.01); *C02F 2201/005* (2013.01); *C02F 2209/00* (2013.01); *C02F 2209/445* (2013.01); *C02F 2301/043* (2013.01); *C02F 2303/16* (2013.01)

(56) References Cited

U.S. PATENT DOCUMENTS

| | | | |
|---|---|---|---|
| 4,298,025 A | 11/1981 | Prior et al. | |
| 4,320,010 A | 3/1982 | Tucci et al. | |
| 4,337,153 A | 6/1982 | Prior | |
| 4,421,652 A * | 12/1983 | Heskett | B01J 49/0091 210/687 |
| 4,427,549 A | 1/1984 | Brown et al. | |
| 6,214,214 B1 | 4/2001 | Hansen et al. | |
| 7,373,949 B2 | 5/2008 | Park | |
| 2009/0301604 A1 | 12/2009 | Williams et al. | |
| 2010/0040454 A1 | 2/2010 | Lillback | |
| 2011/0168608 A1 | 7/2011 | Gaffey | |

* cited by examiner

WATER TREATMENT SYSTEM

CROSS REFERENCES TO RELATED APPLICATIONS

This application filed under 35 U.S.C §371 is a national phase application of International Application Serial Number PCT/US2012/052851 filed Aug. 29, 2012, which claims priority to U.S. Provisional Application 61/528,367, filed Aug. 29, 2011.

TECHNICAL FIELD

The present invention relates generally to water treatment and in particular to an improved control system and control device for controlling a water treatment apparatus.

BACKGROUND OF THE INVENTION

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank. The quantity of water treated by a given tank is monitored by a mechanism that includes a water usage turbine driven by water as it leaves the on-line resin tank. When a determined quantity of water is treated, which produces to a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. As described above, the frequency of regeneration of the water softener system is determined by the usage turbine which directly measures the quantity of fluid treated by a given tank.

In U.S. Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

The control valves disclosed in U.S. Pat. Nos. 4,298,025 and 4,427,549 are examples of Non-Electric, Meter Driven, Demand Initiated Regenerating (DIR) fluid treating control valves. In both cases they have been designed to operate in a "Twin Tank" configuration. That is, one media vessel in Service, and one media tank in Standby mode. These units by virtue of the design features built into the control valve have enabled them to possess operational benefits unlike similar products currently in the Market. Examples include: an uninterrupted supply of treated water, counter-current regeneration, high efficiency by metered usage of the water, and regeneration with treated water to name a few.

These features, while often desirable, do come with a price. The complexity of the valve in terms of moving parts and synchronization, ability to reconfigure for changes in water chemistry, serviceability, footprint, and cost all have contributed to less than universal acceptance. It is therefore recognized that a control valve with far less complexity and increased serviceability, while still retaining key beneficial elements is needed.

SUMMARY OF THE INVENTION

The present invention provides a new and improved control valve and method for controlling a fluid treatment apparatus which includes one treatment tank containing a treatment material disposed in a flow path. The tank defines a fluid flow path through which water to be treated is passed. The treatment tank may form part of a water softener or filter. The disclosed control valve, although similar to the control valves described in U.S. Pat. Nos. 4,298,025 and 4,427,549, which are hereby incorporated by reference, controls communication of water to be treated with the tank inlet and controls the communication of treated water from a tank outlet and a conduit or system outlet. A regeneration determining apparatus that includes a water driven turbine determines when the treatment media requires regeneration.

According to one embodiment, a water treatment system is disclosed that includes a control valve assembly and a single water treatment tank including a treatment material that requires periodic regeneration. The control valve includes a valve housing having multiple levels. A water usage metering mechanism is located within the housing and is operative to monitor the quantity of water treated by the treatment tank. An inlet/bypass valve also forms part of the control valve assembly and is operative to communicate source water with a tank inlet or a treatment system outlet whereby the tank is bypassed. The control valve assembly also includes a fluid pressure operated outlet valve controlling the communication of the tank outlet with the system outlet. A regeneration control mechanism that cooperates with the water usage metering mechanism initiates and controls regeneration of an exhausted tank. The regeneration control mechanism is operative to communicate fluid signals to associated valve components mounted within the valve housing, one of the valve components being a control valve which is opened by a fluid signal from the regeneration control mechanism in order to communicate water to a regeneration control turbine which drives the regeneration control mechanism. The control valve also communicates water to a venturi whereby brine solution from a brine reservoir is communicated to a treatment tank, preferably communicated through the tank outlet. A brine safety valve is provided which controls the communication of the venturi with the treatment tank. A fluid pressure operated drain valve controls the communication of the treatment tank inlet with an ambient drain such that when brine solution is being conveyed to the treatment tank via the tank outlet, the brine solution is discharged through the tank inlet and delivered to the drain.

In the preferred and illustrated embodiment, the water metering mechanism also includes a turbine that is driven by treated water as it is leaving the tank. According to a feature of this invention, the turbine is operatively coupled to a metering disk by a gear train having a plurality of gears, at least one of the gears rotating on a common shaft with the turbine. In a more preferred embodiment, a plurality of gear train gears rotate on the common shaft in order to reduce the volume occupied by the turbine/gear train, thus resulting in a more compact valve housing.

In the illustrated embodiment, a regeneration control turbine forms part of the regeneration control mechanism and preferably rotates in a direction opposite to the direction of rotation of the metering turbine. This feature also contributes to reducing the volume of the valve housing.

In the preferred and illustrated embodiment, the control valve assembly is shown as part of a water softening system. It should be noted, however, that the control valve assembly can be used in other water treatment/filtering applications.

According to another feature of the invention, the control valve assembly includes a cap secured to the valve housing. The preferred valve housing has multiple, separable levels and, in this preferred embodiment, the cap is secured to the valve housing, using the same fasteners that secure the multiple levels of the valve housing together. In the illustrated embodiment, the cap preferably includes a viewing window for viewing metering components within the valve housing or, alternately, the entire cap or portions of the cap are formed from a substantially transparent material in order to view an interior of the valve housing and, in particular, the positions of various water metering components.

In the preferred embodiment, a venturi is disclosed which is removable from the control valve assembly without requiring disassembly of the valve housing. According to a further feature of this enhanced embodiment, a venting element communicating with a regeneration turbine chamber, maintains a predetermined water level in the turbine chamber and is preferably molded into the valve housing. More preferably, an anti-siphoning check valve is located between the venting element and the drain to inhibit drain water from being siphoned into said turbine chamber.

According to the invention, a method for regenerating a water softener or other treatment systems having a resin requiring periodic regeneration using a regeneration solution such as brine that is stored in a reservoir, is disclosed. According to the preferred method, a tank containing a water softening or other water treatment resin is provided, the tank having an inlet and an outlet. Water to be treated is communicated to the inlet and allowed to travel through the resin and then discharged by the outlet.

When the resin in the treatment tank is exhausted, it is regenerated by the following method. Source water at the inlet is communicated directly to the outlet by a bypass passage. A portion of the water at the inlet is communicated to a regenerated control chamber including a turbine which drives a regeneration control mechanism. Inlet water is also communicated to a venturi and then to the tank inlet, such that as water flows through the venturi, a regeneration solution (such as brine) is drawn from a regeneration solution reservoir and communicated to the tank outlet, whereupon it passes through the resin and is discharged to the tank inlet. The tank inlet is concurrently communicated with the drain, thereby discharging the regeneration solution. In the preferred method, the regeneration solution is drawn from the regeneration reservoir until a predetermined quantity of regeneration solution is discharged by the reservoir, whereupon further flow of regeneration solution from the reservoir is blocked. According to the method, water is allowed to continue flowing to venturi and into the outlet of the treatment tank in order to perform a slow rinse. After a predetermined quantity of slow rinse water passes through the treatment tank or after a predetermined amount of time, the communication of the venturi with the tank outlet is blocked in order to terminate the slow rinse step. The water is allowed to continue flowing through venturi and into the regeneration solution reservoir in order to refill the reservoir. Water at the system outlet is then communicated to the outlet of the treatment tank and allowed to pass through the resin and out the tank inlet and then to drain in order to perform a fast rinse. The regeneration sequence is concluded by blocking the bypass passage and communicating inlet water with the tank inlet while concurrently discontinuing communication of the tank inlet with the system drain.

Additional features of the invention will become apparent and a fuller understanding obtained by reading the following detailed description made in connection with the accompanying drawings.

BRIEF DESCRIPTION OF THE DRAWINGS

The foregoing and other features and advantages of the present invention will become apparent to those skilled in the art to which the present invention relates upon reading the following description with reference to the accompanying drawings, in which.

BEST MODE FOR CARRYING OUT THE INVENTION

Figure 1:
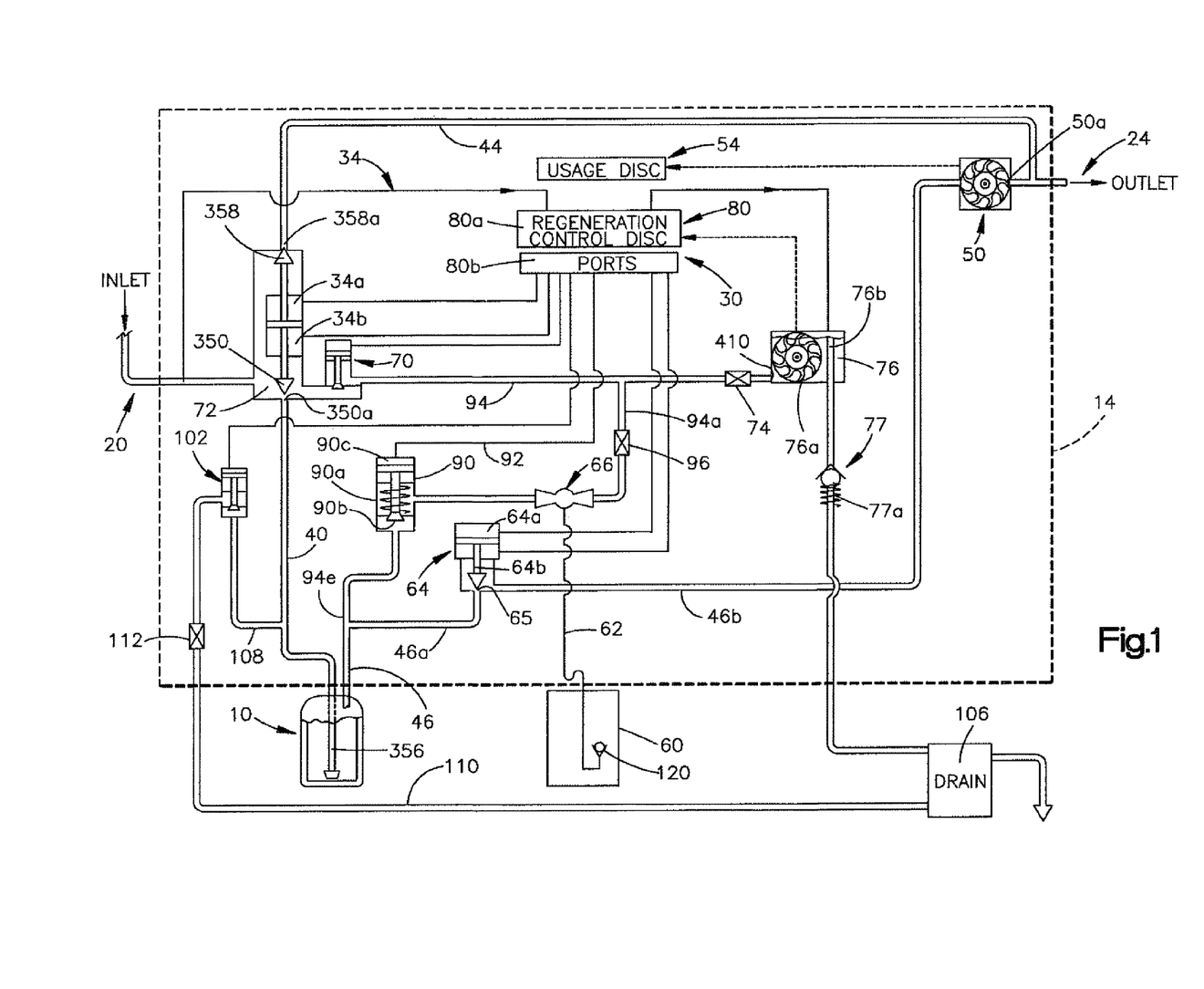
FIG. 1 is a schematic representation of a water treatment system constructed in accordance with a preferred embodiment of the invention.

FIG. 1 schematically illustrates a water treatment system constructed in accordance with a preferred embodiment of the invention. The system includes a treatment tank 10 which may contain an ion exchange resin or other filtering or treatment material that periodically requires regeneration. A control valve assembly 14 is preferably mounted to the top of the tank and controls the communication of source water to be treated at an inlet 20 with the treatment tank 10 and/or with an outlet 24. The outlet 24 is typically connected to a water distribution system in a house or business. The control valve assembly 14 also controls the regeneration of the treatment tank 10 when it is exhausted.

The control valve assembly 14 includes a plurality of water pressure operator valves, the opening and closing of which are controlled by a fluid signal control system indicated generally by the reference character 30.

In particular, the valve assembly includes a fluid pressure operated inlet/bypass valve 34 which, in a first position (shown in FIG. 1), allows source water at the inlet 20 to flow into the treatment tank via conduit or passage 40. In another position termed a "bypass" position, the valve 34 blocks communication of the inlet 20 with the tank conduit 40 and instead allows communication between the inlet 20 and a bypass conduit or passage 44 which allows source water at the inlet 20 to flow directly to the outlet 24, thus bypassing the treatment tank 10. When the treatment tank is being regenerated, the inlet/bypass valve 24 moves to its bypass position so that untreated water is supplied to the water distribution system and, thus, the flow of water to the house or business is not interrupted during regeneration.

When water is being treated, i.e., the inlet/bypass valve 34 is in the position shown as FIG. 1, treated water is discharged by the treatment tank 10 into an outlet conduit 46 and flows to and through a turbine chamber 50 via conduits 46a, 46b. From the turbine chamber the treated water travels to the outlet 24. The water flowing through the turbine chamber 50 causes rotation of a turbine 50a that forms part of a water usage monitoring mechanism 54, which monitors the quantity of water treated by the treatment tank 10. This monitored information is used to trigger regeneration of the treatment tank 10 when a predetermined amount of water has been treated.

To facilitate the explanation, the system shown in FIG. 1 will be described as it would operate as a water softening system. As is known, in a water softening system, source water is passed through a treatment tank which removes hard ions from the water. The captured ions must be removed from the ion exchange resin periodically. This is achieved through a regeneration process which involves the communication of a brine solution through the ion exchange resin. The brine solution is supplied from a brine tank 60 which includes a brine conduit 62 connected to a venturi 66.

When regeneration of the ion exchange or resin tank 10 is needed, a regeneration sequence is initiated by the water usage monitoring mechanism 54. The regeneration sequence includes shifting of the inlet/bypass valve 34 to its bypass position at which inlet water is blocked from the conduit 40 and, instead, is communicated directly to the bypass conduit 44 and thus directly to the outlet 24. Concurrently with the shifting of the inlet/bypass valve 34, an outlet valve 64 is closed by pressurizing an associated pressure chamber 64a in order to drive a valve element 64 b downwardly so that it engages an associated seat 65 and thus blocks communication between the outlet conduit 46a and the branch outlet conduit 46b. A regeneration control valve 70 is also opened in order to allow source water from an inlet chamber 72 to travel through a restrictor 74 to a regeneration control turbine chamber 76. The stream of water passing through the chamber causes rotation of a regeneration control turbine 76a. The turbine 76a forms part of a regeneration control mechanism 80. In particular, the rotation of the turbine 76a effects rotation of a regeneration control disk 80a which rides atop a fixed port disk 80b. As a regeneration control disk rotates, various ports are covered and uncovered to communicate pressurized water or to provide a depressurizing drain path to chambers of the various control valves, thus opening and closing the valves. Details of the regeneration control mechanism can be found in U.S. Pat. No. 4,298,025, which is hereby incorporated by reference. The opening of the control valve also supplies the feed (drive) water to the venturi 66.

After the inlet/bypass valve 34 is shifted to its bypass position, a brine safety valve 90 is moved to its open position (shown closed in FIG. 1) when the regeneration control disk 80a exposes a port defined by the ports disk 80b and pressurizes the feed line 92 thus overcoming a spring 90a to cause a valve element 90b of the brine safety valve 90 to move from the position shown in FIG. 1 to an open position. When the valves 70 and 90 open, inlet water is fed to the venturi 66 via the conduit/passage 94 and the branch conduit/passage 94a. The branch conduit 94a includes an optional restrictor 96 to control the rate of flow through the venturi 66. As the water flows through the venturi 66, brine solution is drawn from the brine conduit 62 and mixed with the water flowing in the branch conduit 94a. This brine solution is conveyed through the brine safety valve 90 and into the outlet 46 of the treatment tank. During this step, a drain valve 102 is also opened which communicates the inlet conduit 40 with a drain 106 via branch conduit 108 and drain conduit 110. The drain conduit 110 includes a restrictor 112. In the illustrated configuration, the brine solution flows in a downflow direction from the tank outlet 46 and is discharged into the tank inlet conduit 40 and ultimately to the drain 106.

When sufficient brine solution is passed through the treatment tank 10, the brine solution level in the brine tank 60 will fall and a flow switch or air-check 120 will close off the brine conduit 62, thus inhibiting the further flow of brine solution or air to the venturi. As long as the regeneration control valve 70 remains open, water from the inlet chamber 72 will flow through the venturi 66, through the brine safety valve 90 and into the outlet 46 of the treatment tank 10. This will effectively rinse the treatment tank with source water. When sufficient rinsing has occurred, the regeneration control disk 80a will move to a position that will allow pressurized water pressure signal to pressurize the outlet valve chamber 64a. This will cause the outlet valve 64 to open allowing a higher volume of outlet water to pass through conduit 46a and conduit 46 through the treatment tank 10, through conduit 108, through open drain valve 102, through restrictor 112, through conduit 110 to drain. This higher volume provides a fast rinse or backwash to the media. The volume of fast rinse/backwash is controlled by restrictor 112. The source of the fast rinse/backwash is outlet water that passes in a reverse direction through turbine chamber 50. In a similar manner after a predetermined time or a predetermined movement in the regeneration control disk 80a, the treatment tank will be returned to service by opening valve 34. Subsequently valve 90 will close followed by regeneration control valve 70. This stops the flow of water to the regeneration turbine 76 thereby stopping the movement of the regeneration control disk 80 and isolates brine tank 60 and conduit 62 from any pressurized source. It should be noted here that as long as the regeneration control valve 70 remains open however, water will flow to the venturi 66 and down the brine supply line 62, thus refilling the brine tank 60. However, during this part of the regeneration sequence, the brine safety valve 90 is closed to block brine solution from being communicated to the tank.

The usage disk 54 which monitors the amount of water treated by the treatment system and which is used to trigger the regeneration of an exhausted tank can take the form of the mechanism shown in U.S. Pat. Nos. 4,298,025 and 6,214,214, which are hereby incorporated by reference, and/or U.S. Pat. No. 4,427,549. Alternately, the usage disk mechanism can comprise the usage monitoring mechanism illustrated in pending International Appln. No. PCT/US2011/063085, which is also incorporated by reference.

FIGS. 2-12B include exploded and elevational views of the control valve assembly 14 that is shown schematically in FIG. 1. To facilitate the explanation, the components illustrated in FIG. 12B will be given the same reference characters that were used in FIG. 1 to point to their schematic counterparts.

Figure 9A:
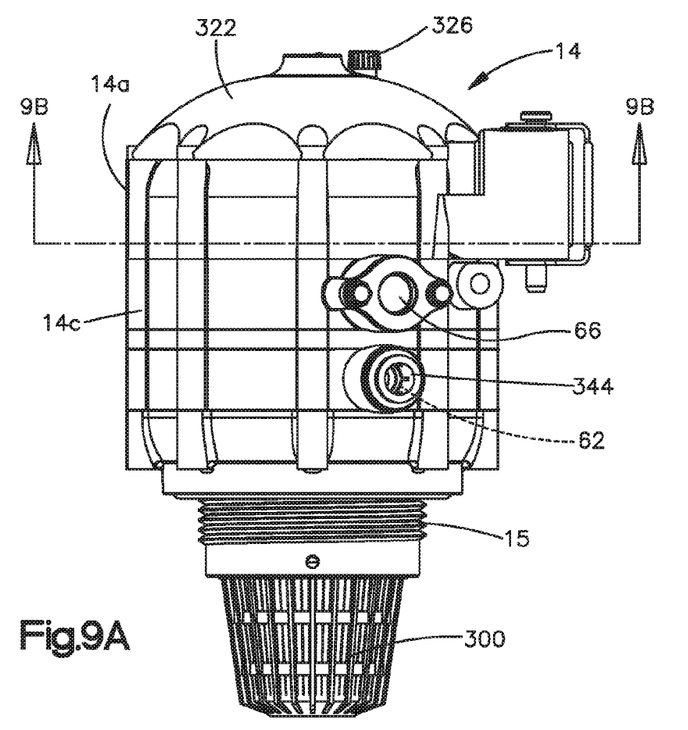
FIG. 9A is a side elevational view of the control valve assembly shown schematically in FIG. 1.
Figure 10A:
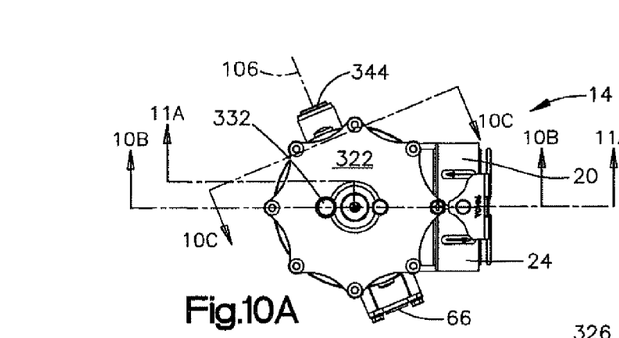
FIG. 10A is a top plan view of the control valve assembly.
Figure 10B:
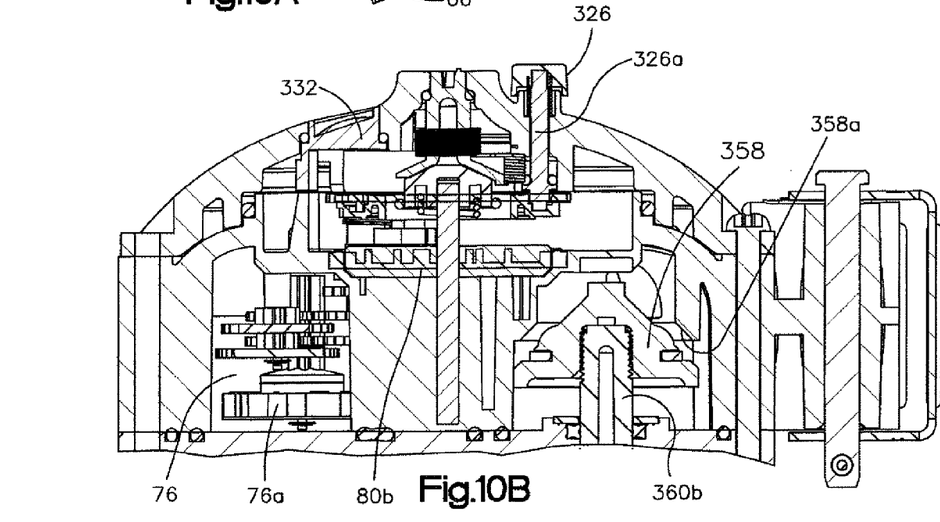
FIG. 10B is a fragmentary sectional view of the control valve assembly as seen from the plane indicated by the line 10-10B in FIG. 10A.

FIGS. 9A and 10A are side elevational and top plan views, respectively, of the control valve assembly 14. The illustrated control valve assembly is similar in appearance to prior art control valve assemblies manufactured and sold by the Assignee of the subject application and which are illustrated, for example, in U.S. Pat. Nos. 4,298,025 and 6,214,214. As is conventional, the control valve assembly 14 includes a depending, threaded neck 15 which is received by a threaded opening in the resin tank 10 (shown in FIG. 1). A filter 300 inhibits discharge of resin or filter material from the tank 10. As seen best in FIG. 10A, control valve assembly 14 includes an inlet fitting 20 for receiving source water and an outlet fitting 24 for discharging water from the control valve 14. The fitting 24 is typically connected to a household water supply. The control valve assembly 14, like its predecessor valves, is a multi-level valve. However, the control valve 14 assembly of the present invention is more compact and smaller in size and has a volume of no more than 70 cubic inches (as compared to 122 cubic inches of the prior valve) and can sustain a water flow rate through the control valve assembly of greater than nine (9) gallons per minute at a pressure drop of less than 15 psi.

Figure 2:
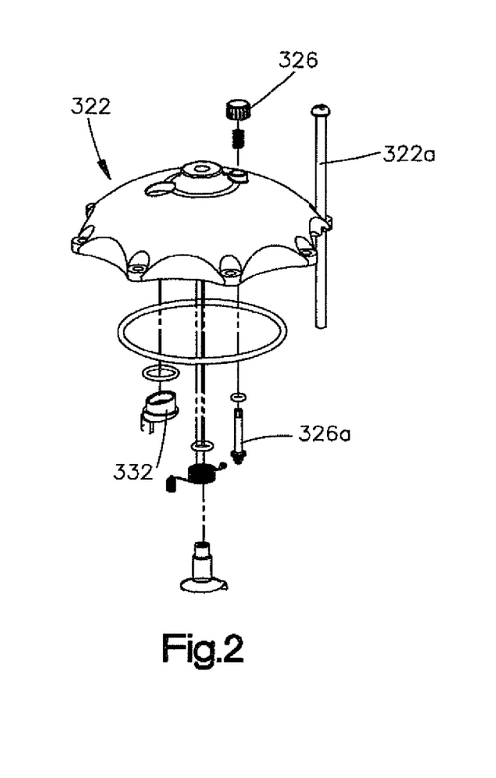
FIG. 2 is an exploded view of a cap assembly that forms parts of the control valve assembly shown schematically in FIG. 1.
Figure 3:
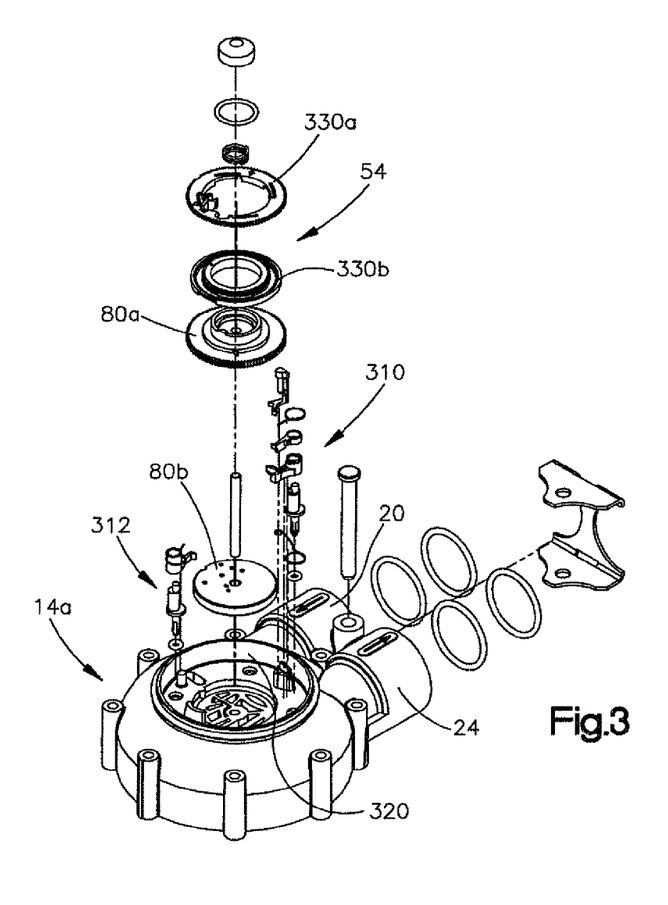
FIG. 3 is an exploded view of an upper portion of the control valve assembly shown schematically in FIG. 1.

Referring to FIGS. 2 and 3, a top level 14a of the control valve assembly 14 is illustrated. The level 14a mounts the valve control system 30 that includes the usage or metering disk mechanism 54 and the regeneration control mechanism 80. The regeneration control mechanism includes the rotatable regeneration control disk 80 that rotates the top, the port disk 80b. Turbine-driven pawl/ratchet mechanisms indicated generally by the reference characters 310, 312 index or rotate respective usage disks 54 and regeneration control disk 80a. Details of how the pawl/ratchet mechanisms function can be found in pending International Appln. No. PCT/US2011/063085, which is also incorporated by reference.

U.S. Ser. No. 61/419,339 (now U.S. Publication No. 2013/0248457) which details the operation of the alternate usage disk mechanism, and U.S. Pat. No. 4,298,025, are hereby incorporated by reference.

The fluid signal control system 30 and water usage monitoring mechanism 54 and regeneration control mechanism 80 are housed within a recess or chamber 320 formed in the top level 14a of the control valve housing. A cap 322 seals the chamber 320 and is shown best in FIG. 2. It should be noted that the cap 322 is held in place by the same screws 322 that hold the multiple levels or sections of the control valve assembly together. The cap in prior designs was held in place by separate screws or fasteners. This feature facilitates assembly and reduces costs and the number of parts.

The cap 322 includes a rotatably mounted adjusting knob 326 for adjusting the frequency of regeneration. The knob is operatively coupled to a shaft or stem 328 which is engageable with an upper metering ring 330a forming part of the water usage mechanism 54. The knob is used to adjust the relative position of the upper ring 330a with respect to a lower metering ring or disc 330b. The cap includes a viewing window 332 which allows viewing of the relative positions of the upper and lower metering discs 330a, 330b. By limiting the size of the viewing window, problems of algae growth, etc., when the unit is mounted outside, are substantially reduced. A complete explanation of the operation of this mechanism can be found in U.S. Publication No. 2013/0248457. In an alternate embodiment, the entire cap 322 or portions of the cap can be made of a transparent material eliminating the separate viewing window 332.

Figures 4, 5:
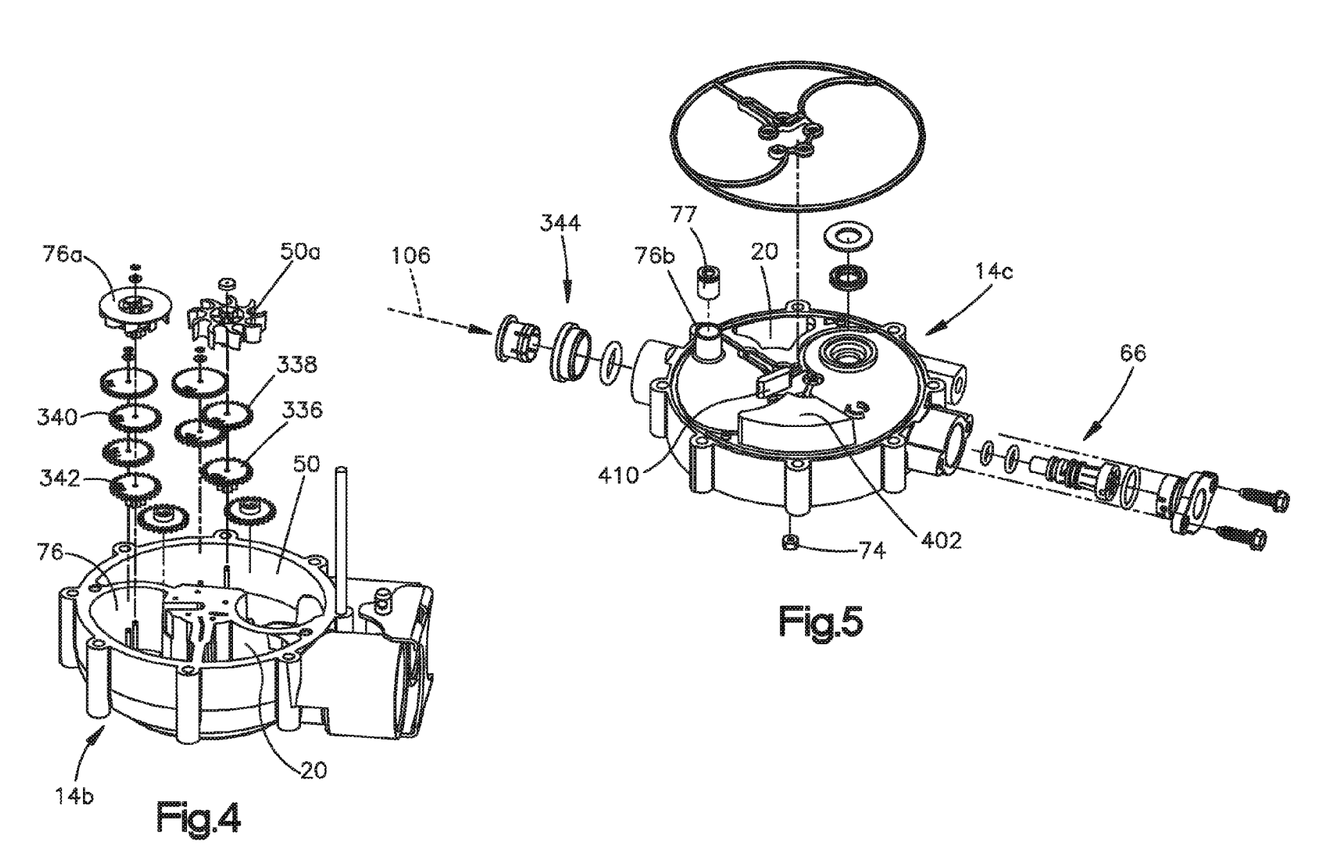
FIG. 4 is an exploded view of water usage and regeneration turbines and associated reduction gear trains that form part of the of the control valve assembly shown schematically in FIG. 1.
FIG. 5 is an exploded view of the control valve assembly showing a venturi subassembly forming part of the control valve assembly.

FIG. 4 illustrates a second level 14b of the control valve assembly 14 and illustrates the regeneration control and usage turbines 50a, 76a, their associated reduction gear trains which are coupled to the associated pawl mechanisms 310, 312 shown in FIG. 3. The level 14b includes the regeneration and usage turbine chambers 76, 50.

According to the invention, the water usage and regeneration control mechanisms 54, 80 are configured to minimize the volume that they need to occupy within the valve assembly 14. To achieve this feature, at least some of the gear wheels, for example, gear wheels 336, 338, 340, 342 rotate on the same axle as their respective turbines 50a, 76a, rather than on separate axles.

FIG. 5 illustrates a third level 14c of the control valve assembly and removably mounts the venturi 66, which allows the venturi to be easily serviced without valve disassembly. The restrictor 74 for the regeneration turbine feed passage is mounted within a passage formed in the valve level 14c. It should also be noted here, that in the preferred embodiment, fluid conduit connections such as connection 344 (which connects the drain line 106 to the control valve assembly) are made to the valve using a quick release connector, which is available from Parker Hannifin and is termed a "true seal push-to-connect fluid connector."

Figure 6:
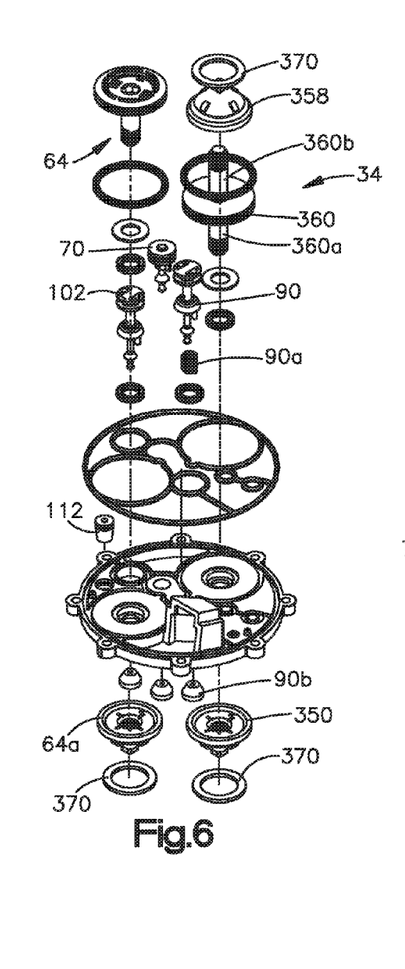
FIG. 6 is an exploded view of a portion of the control valve assembly.
Figure 7:
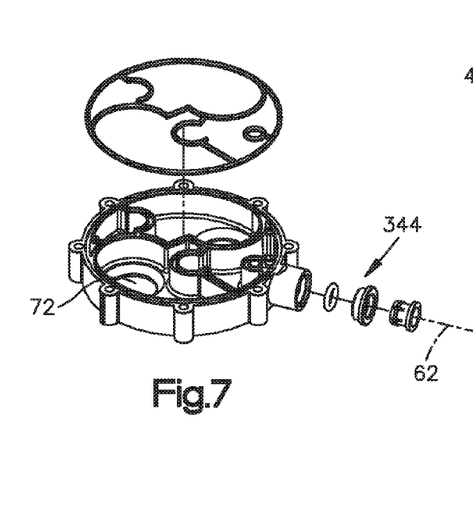
FIGS. 7 and 8 are exploded views of other portions of the control valve assembly shown schematically in FIG. 1.
Figure 8:
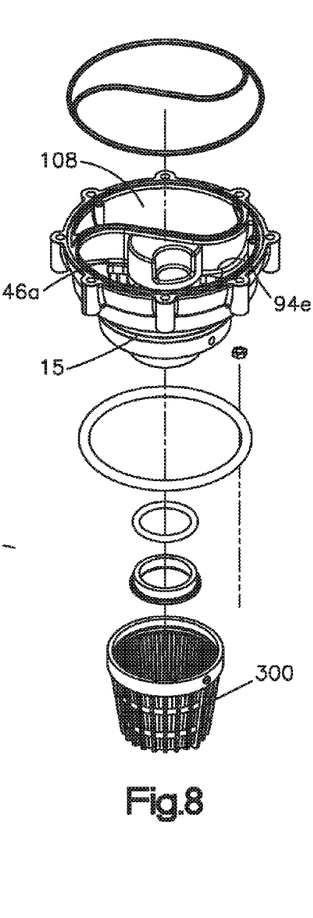
Figure 11A:
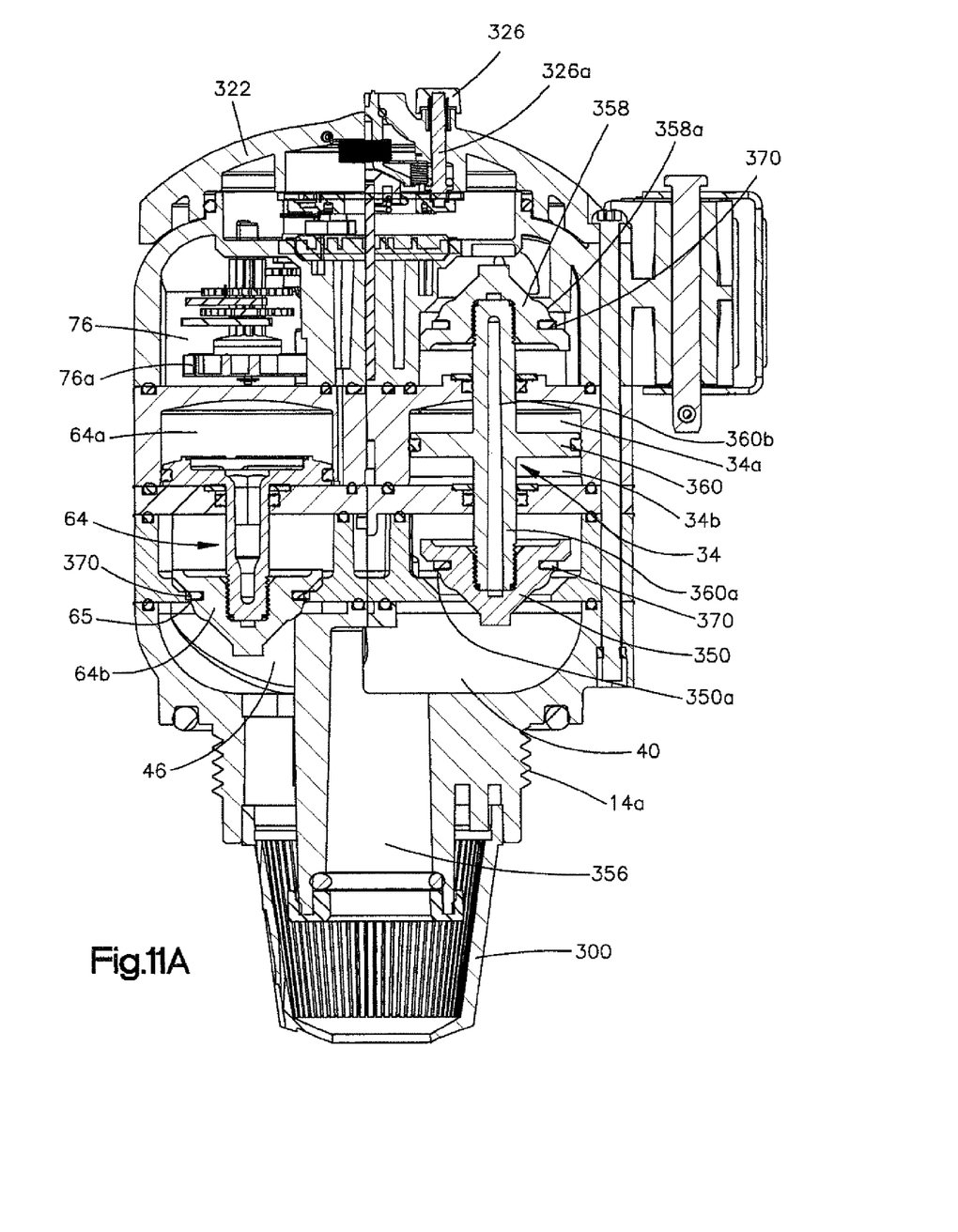
FIG. 11A is a sectional view of the control valve assembly as seen from plane indicated by the line 11A-11A in FIG. 10A.
Figures 12A, 12B:
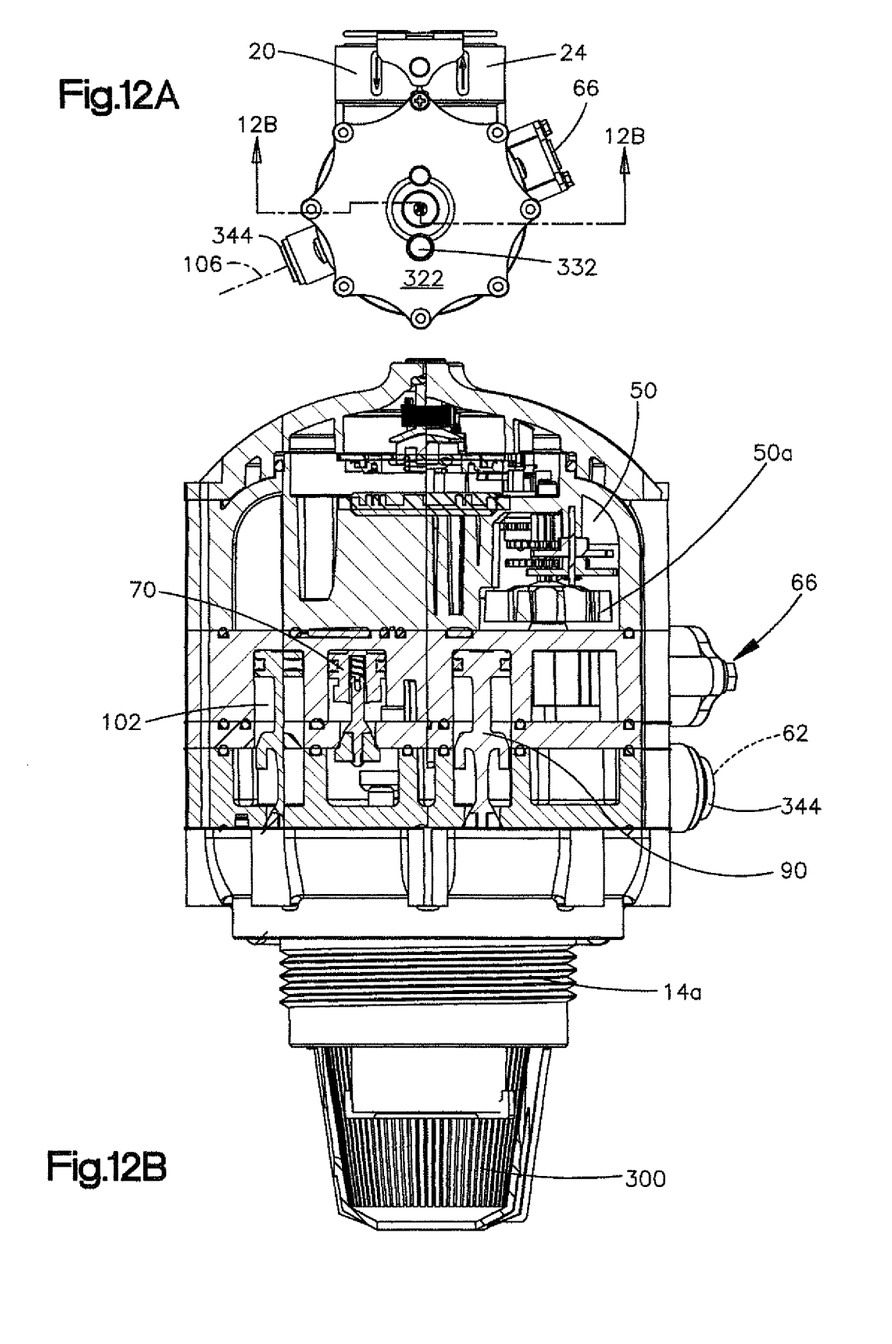
FIG. 12A is another to plan view of the control valve assembly.
FIG. 12B is a sectional view of the control valve assembly as seen from the plane indicated by the line 12B-12B in FIG. 12A.

FIG. 6 illustrates the bypass valve 34, as well as the outlet valve 64, the regeneration control valve 70, the brine safety valve 90 and the drain valve 102. FIG. 11A illustrates the bypass valve 34, along with its servo chambers 34a, 34b, which are pressurized and depressurized in order to move the bypass valve from a first position, where it allows source water to flow into the inlet conduit 40 (shown in FIGS. 1 and 11A). In this position, a valve seat or head 350 is spaced above its associated sealing surface 350a and allows communication of source water to a feed conduit 356 centered within the tank 10. When in this position, an upper valve head 358 (as viewed in FIG. 10b) engages its associated sealing surface 358a and blocks communication to the outlet/bypass conduit 44 (shown in FIG. 1).

Referring to FIG. 11A, the outlet valve 64 is shown and includes a servo chamber 64a and a valve element 64b, which is engageable with an associated seat 65. In the position shown in FIG. 11A, the outlet valve is closed and blocks the tank outlet passage 46.

Figure 10C:
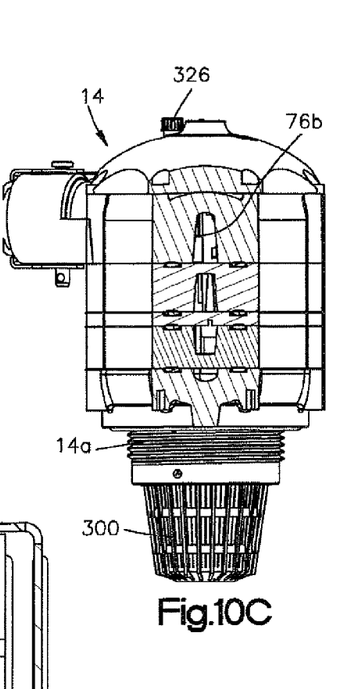
FIG. 10C is a sectional view of the control valve assembly as seen from the plane indicated by the line 10C-10C in FIG. 10A.

Referring to FIGS. 1, 5 and 10C, a venting element 76b, which maintains a predetermined water level in the regeneration turbine chamber 76a, preferably comprises a tube molded into the third level 145c of the control valve assembly 14 (the tube is best shown in FIG. 5).

The function of the venting element 76b is best illustrated in FIG. 1. Referring to both FIG. 1 and FIG. 5, in the preferred and illustrated embodiment, a check valve 77 is employed to inhibit siphoning. As seen best in FIG. 1, the check valve is preferably a biased check valve, and blocks flow from the drain to the regeneration turbine chamber 76a. The bias check valve 77 inhibits flow of water from the regeneration chamber 76a to the drain until a biasing force (indicated schematically by the reference character 77a) is overcome, allowing the ball check to open and then allow flow from the chamber 76a to drain. A check valve suitable for this application is available from Neoperl Inc.

Referring to FIG. 6, the inlet/bypass valve 34 includes a double acting piston 360 from which stems 360a, 360b extend. The stems 360a, 360b receive the corresponding inlet and bypass seats or valve heads 350, 358 which mount sealing elements 370. The seats 350, 358 move towards and away from associated sealing surfaces 350a, 358a, respectively. In particular, when the upper pressure chamber 34a is pressurized, the bypass valve 34 moves downwardly until the inlet seat 350 moves into sealing contact with the associated sealing surface 350a and blocks the flow of water into the tank 10. When the lower pressure chamber 34b is pressurized, the bypass inlet/bypass valve 34 moves upwardly until its upper seat 358 sealingly engages the associated sealing surface 358a, thus blocking the flow of source water to the bypass passage 44. Similarly, the outlet valve 64 includes the seat 64b and the servo chamber 64a. When the servo chamber 64a is pressurized, the outlet valve is moved downwardly, as viewed in FIGS. 1 and 10B, until its associated seat or head 64b engages the associated sealing surface 65, thus blocking the flow of water into or out of the tank outlet passage 46.

Figure 9B:
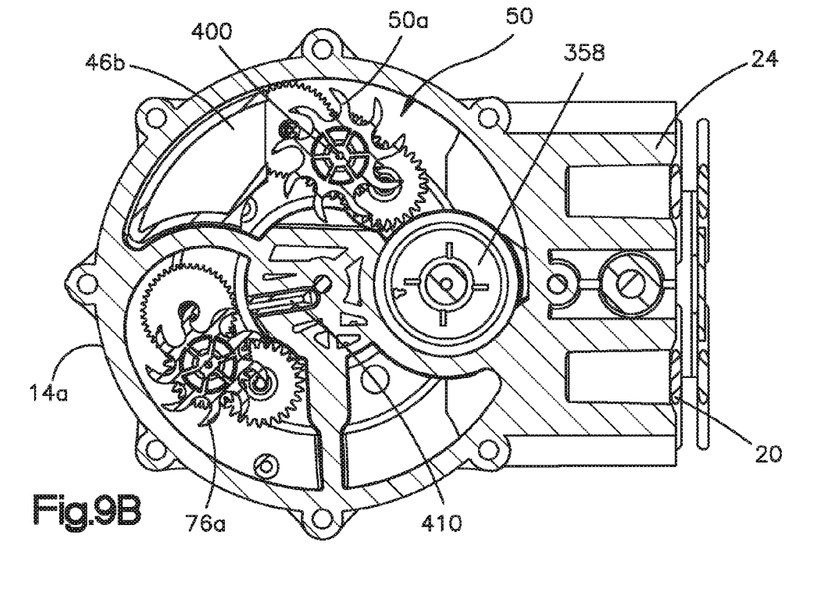
FIG. 9B is a sectional view of the control valve assembly as seen from the plane indicated by line 9B-9B and FIG. 9A.

Referring to FIG. 9B, the regeneration and usage turbine mechanisms are illustrated. The water usage turbine 50a rotates on a shaft 400 it shares with some of the gears in its associated reduction gear train (shown best in FIG. 4). Water leaving the control assembly 14 must pass through a nozzle chamber 402 formed as part the third level 14c and seen best in FIG. 5. A suitably positioned opening in a sidewall of the nozzle chamber 402 directs the water flow which causes the water to impinge against the blades of the turbine 50a, thus producing rotation. Rotation of the turbine 50a operates the pawl mechanism 310 (shown in FIG. 3) in order to rotate the water usage disk 54 as more fully explained in U.S. Publication No. 2013/0248457. In order to reduce space requirements, the rotation of the turbine 50a is opposite that of the regeneration turbine 76a which as viewed in FIG. 9B is below the water usage turbine 50a. By configuring the water usage turbine to rotate in the clockwise direction (as viewed in FIG. 9B), a compact design was realized. As those in the skill will recognize, if the water usage turbine 50a was designed to rotate in the counterclockwise directions as is the case in prior designs, either the turbine 50a would have to be moved from its location shown in FIG. 9B, or the nozzle chamber 402 for directing water against the turbine would have to be moved and made smaller and made more restricted. Changing the location of the turbine 50a and/or the channel 402 would increase the overall size of the control valve assembly 14.

The regeneration turbine 76a, as viewed in FIG. 9B, is intended to rotate counterclockwise and is driven by a stream of water that is discharged by a regeneration control nozzle 410. Source water under pressure is delivered to the regeneration control turbine during a regeneration cycle as controlled by the regeneration control valve 70. Because the water usage disc or ring 54 is driven by a ratchet/pawl mechanism, the direction of rotation of the pawl (as driven by the usage turbine 50a) does not affect the direction of rotation of the water usage ring itself.

With the disclosed invention, a compact, non-electric control valve assembly for a single tank water treatment system, such as a water softener, is realized. The control valve assembly allows easy serviceability of the venturi assembly and does not negatively impact the rate of flow that can be sustained through the valve during its operation.

From the above description of the invention, those skilled in the art will perceive improvements, changes and modifications.

Having described the invention, we claim:

1. A control valve assembly for a single tank water treatment system of the type in which a treatment tank requires periodic regeneration, comprising:
   a) a valve housing having multiple levels;
   b) a water usage metering mechanism located within said housing and operative to monitor the quantity of water treated by said treatment tank;
   c) an inlet/bypass valve located within said housing and operative to communicate either a source of water with a tank inlet of said treatment tank or to communicate said source of water with a system treatment outlet whereby said tank is bypassed;
   d) a fluid pressure operated outlet valve for controlling the communication of an outlet of said tank with said system outlet;
   e) a regeneration control mechanism cooperating with said metering mechanism to initiate and control regeneration of said treatment tank, said regeneration control mechanism operative to communicate fluid signals to associated valve components forming part of said control valve assembly and mounted within said valve housing one of said valve components being a control valve which is opened by a fluid signal from said regeneration control mechanism and controls communication of water to a regeneration control turbine and to a venturi, whereby brine solution from a brine reservoir is communicated to said treatment tank;
   g) a structure for directing a fluid stream at said regeneration turbine such that said regeneration control turbine rotates in a direction opposite to a direction of rotation of a metering turbine forming part of said water usage metering mechanism; and
   h) a fluid pressure operated drain valve for controlling the communication a treatment tank inlet conduit with an ambient drain.

2. The apparatus of claim 1 wherein said metering turbine is operatively coupled to a metering disk by a gear train having a plurality of gears, at least one of said gears rotating on a common shaft with said metering turbine.

3. The apparatus of claim 1 wherein said control valve assembly is a water softener control valve and forms part of said water treatment system and said water treatment system is a water softening system and includes a treatment tank containing water treatment resin.

4. The apparatus of claim 1 wherein said control valve assembly includes a cap secured to said valve housing, wherein said multiple levels are separable and said separable levels and said cap are secured together by common fasteners.

5. The apparatus of claim 4 wherein said cap includes a viewing window which permits viewing of operative positions of components forming part of said water usage metering mechanism.

6. The apparatus of claim 4 wherein said cap is substantially transparent in order to permit viewing of internal components of said control valve assembly including said water usage metering mechanism.

7. The apparatus of claim 1 wherein said venturi is removable from said control valve assembly without requiring disassembly of said valve housing.

8. The apparatus of claim 1 wherein said regeneration control turbine rotates within a turbine chamber and said chamber includes a venting element for maintaining a predetermined water level in said regeneration turbine chamber.

9. The apparatus of claim 8 wherein said venting element includes a check valve which blocks flow from said drain into said regeneration turbine chamber.

10. The apparatus of claim 9 wherein said check valve is a biased check valve and further restricts flow between said regeneration control chamber and said drain until sufficient pressure is established in said venting element to overcome a biasing force exerted on said check valve.

11. The apparatus of claim 8 wherein said venting element is a tube molded into one of said levels of said valve housing.

12. The apparatus of claim 1 wherein said control valve assembly is a water softener control valve.

\* \* \* \* \*